US011842225B2

(12) United States Patent
Story et al.

(10) Patent No.: US 11,842,225 B2
(45) Date of Patent: *Dec. 12, 2023

(54) SYSTEMS AND METHODS FOR DECENTRALIZED-DISTRIBUTED PROCESSING OF VEHICLE DATA

(71) Applicant: STEERING SOLUTIONS IP HOLDING CORPORATION, Saginaw, MI (US)

(72) Inventors: Michael R. Story, Bay City, MI (US); Keyur R. Patel, Rochester, MI (US); Farhad Bolourchi, Novi, MI (US); Joachim J. Klesing, Rochester, MI (US); Mariam S. George, Lake Orion, MI (US); Peter D. Schmitt, Farmington Hills, MI (US); Larry J. Wilson, Saint Clair Shores, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/027,811

(22) Filed: Sep. 22, 2020

(65) Prior Publication Data

US 2021/0103480 A1 Apr. 8, 2021

Related U.S. Application Data

(60) Provisional application No. 62/910,062, filed on Oct. 3, 2019.

(51) Int. Cl.
*G06F 9/50* (2006.01)
*G06F 9/48* (2006.01)

(52) U.S. Cl.
CPC .......... *G06F 9/5083* (2013.01); *G06F 9/4887* (2013.01)

(58) Field of Classification Search
None
See application file for complete search history.

(56) References Cited

U.S. PATENT DOCUMENTS

2005/0283291 A1\* 12/2005 Whang ................ B62D 5/0484
180/443
2007/0094270 A1\* 4/2007 Gallino ................ G06F 9/5044
(Continued)

OTHER PUBLICATIONS

Wu, Dexiang et al. "A Trust-Aware Task Offloading Framework in Mobile Edge Computing". IEEE Access. (Year: 2019).*

(Continued)

*Primary Examiner* — Adam Lee
(74) *Attorney, Agent, or Firm* — Dickinson Wright PLLC (57) ABSTRACT

A method for distributed processing includes receiving an idle time and at least one task execution characteristic corresponding to each respective processor of a plurality of processors, wherein at least one processor of the plurality of processors is remotely located from other processors of the plurality of processors. The method also includes identifying a target processor of the plurality of processors to execute a task based on the idle time and the at least one task execution characteristic of the target processor. The method also includes communicating, to the target processor, a task request requesting the target processor execute the task and, in response to receiving a communication from the target processor indicating acceptance of the task, communicating, to the target processor, instructions for executing the task.

14 Claims, 7 Drawing Sheets

(56) References Cited

U.S. PATENT DOCUMENTS

| | | | | |
|---|---|---|---|---|
| 2008/0007765 | A1* | 1/2008 | Ogata | G06F 9/505 |
| | | | | 358/1.15 |
| 2014/0188388 | A1* | 7/2014 | Malahy | G01C 21/3446 |
| | | | | 701/400 |
| 2015/0007185 | A1* | 1/2015 | Dey | G06F 9/4843 |
| | | | | 718/102 |
| 2016/0306673 | A1* | 10/2016 | You | G06F 9/5038 |
| 2016/0378443 | A1* | 12/2016 | Sun | G06F 8/41 |
| | | | | 717/140 |
| 2018/0001887 | A1* | 1/2018 | Watanabe | B60W 30/025 |
| 2018/0052698 | A1* | 2/2018 | Holler | G06F 9/45533 |
| 2019/0034250 | A1* | 1/2019 | Fuchs | G06F 9/546 |
| 2019/0373051 | A1* | 12/2019 | Binotto | H04L 67/1012 |
| 2019/0375298 | A1* | 12/2019 | Symanow | B60L 50/61 |
| 2020/0195468 | A1* | 6/2020 | Kwon | H04L 12/40013 |
| 2020/0211301 | A1* | 7/2020 | Zhang | H04L 63/065 |
| 2020/0398671 | A1* | 12/2020 | Awad Alla | B60L 58/12 |

OTHER PUBLICATIONS

Official Letter from the German Patent and Trademark Office for related German Patent Application No. 102020125714.7, dated Jul. 2, 2021, 10 page(s).

Bansal, S., et al. Adaptive Decentralized Load Sharing Algorithms with Multiple Job Transfers in Distributed Computing Environments. International Journal of Recent Trends in Engineering, vol. 2, No. 2, Nov. 2009, pp. 217-221.

Mishra, G., et al., Task Scheduling with Load Balancing on Automotive Multicore ECUs, International Conference on Recent Innovations in Electrical, Electronics & Communication—Engineering—(ICRIEECE), 2018, pp. 1993-1995.

* cited by examiner

SYSTEMS AND METHODS FOR DECENTRALIZED-DISTRIBUTED PROCESSING OF VEHICLE DATA

CROSS-REFERENCES TO RELATED APPLICATIONS

This patent application claims priority to U.S. Provisional Patent Application Ser. No. 62/910,062, filed Oct. 3, 2019 which is incorporated herein by reference in its entirety.

TECHNICAL FIELD

This disclosure relates to vehicle software management and in particular to systems and methods for distributed processing within an information ecosystem.

BACKGROUND OF THE INVENTION

Vehicles, such as cars, trucks, sport utility vehicles, crossovers, mini-vans, or other suitable vehicles, are increasingly providing complex technology that offers operators of such vehicles increased functionality and safety features. For example, such vehicles typically include advanced mirror control, complex engine control, driver assist features (e.g., adaptive cruise control, and the like), complex safety features, and the like.

As the complexity of such technology continues to increase, vehicle mechanical systems are being replaced by complex electronics control units (ECU). Such ECUs are typically programmed with software to perform the desired features of the vehicle. ECUs typically communicate over various networks within such vehicles. In order to provide features, such as those described, vehicles may include an increased number of ECUs, which, accordingly, may be programmed with increasingly complex software. Increased software functionality and complexity may make ECU throughput management challenging.

SUMMARY OF THE INVENTION

This disclosure relates generally to distributed processing.

An aspect of the disclosed embodiments includes a system for distributed processing. The system includes a source processor and a memory. The memory includes instructions that, when executed by the source processor, cause the source processor to: receive, from a plurality of other processors, an idle time and at least one task execution characteristic corresponding to each respective processor of the plurality of other processors, wherein at least one processor of the plurality of other processors is remotely located from the source processor; identify at least one target processor of the plurality of other processors to execute a task associated with the source processor based on the idle time and the at least one task execution characteristic of the at least one target processor; communicate, to the at least one target processor, a task request requesting the at least one target processor execute the task associated with the source processor; and, in response to receiving a communication from the at least one target processor indicating acceptance of the task, communicate, to the at least one target processor, instructions for executing the task.

Another aspect of the disclosed embodiments includes a method for distributed processing. The method includes receiving, at a source processor and from a plurality of other processors, an idle time and at least one task execution characteristic corresponding to each respective processor of the plurality of other processors, wherein at least one processor of the plurality of other processors is remotely located from the source processor. The method also includes identifying at least one target processor of the plurality of other processors to execute a task associated with the source processor based on the idle time and the at least one task execution characteristic of the at least one target processor. The method also includes communicating, to the at least one target processor, a task request requesting the at least one target processor execute the task associated with the source processor and, in response to receiving a communication from the at least one target processor indicating acceptance of the task, communicating, to the at least one target processor, instructions for executing the task.

Another aspect of the disclosed embodiments includes a distributed processing apparatus. The apparatus includes a processor of a vehicle and a memory. The memory includes instructions that when executed by the processor, cause the processor to: receive, from at least one other processor of the vehicle and at least one other processor remotely located from the vehicle, an idle time and at least one task execution characteristic corresponding to each respective processor of the at least one other processor of the vehicle and the at least one other processor remotely located from the vehicle; identify at least one target processor of the at least one other processor of the vehicle and the at least one other processor remotely located from the vehicle to execute a task associated with the processor of the vehicle based on the idle time and the at least one task execution characteristic of the at least one target processor; communicate, to the at least one target processor, a task request requesting the at least one target processor execute the task associated with the processor of the vehicle; and, in response to receiving a communication from the at least one target processor indicating acceptance of the task, communicate, to the at least one target processor, instructions for executing the task.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, or other suitable vehicles, are increasingly providing complex technology that offers operators of such vehicles increased functionality and safety features. For example, the automotive software industry has evolved rapidly from few features to more advanced features, such as advanced autonomous features, advanced driver-assistance systems (ADAS), advanced mirror control, complex engine control, driver assist features (e.g., adaptive cruise control, and the like), complex safety features, and the like.

As the complexity of such technology continues to increase, vehicle mechanical systems are being replaced by complex electronics control units (ECU). Such ECUs are typically programmed with software to perform the desired features of the vehicle. ECUs typically communicate over various networks within such vehicles. In order to provide features, such as those described, vehicles may include an increased number of ECUs, which, accordingly, may be programmed with increasingly complex software.

This increase in the number and complexity of such features has created a need for more software complexity such as advance prognostics, fail operations, fail tolerances, higher safety levels, and the like. More software functionality and complexity may create a challenge for ECU and/or software throughput management. Current electronic power steering (EPS) system production projects and/or steer by wire software development may experience such software throughput challenges. Higher throughput (e.g., between 80% and 92% and treading higher) may cause data corruption and ECU reset, which may lead to a catastrophic event.

Typical approaches to address such throughput challenges include: changing a central processing unit (CPU) clock; changing the CPU instruction wait time; optimizing functions related to the software; reducing functionality provided by the software; optimizing function execution (e.g., such that wait time is reduced); and diversifying design approach using a timer, direct memory access (DMA), other peripherals, or a combination thereof, all to reduce wait time. However, such approaches may be trivial to implement technically, may negatively impact performance of such systems.

Accordingly, systems and methods, such as those described herein, that are configured to improve software throughput management, while maintaining hardware performance, may be desirable. In some embodiments, the systems and methods described herein may be configured to dynamically distribute task execution management using various processors of ECUs in a vehicle and/or various processors of corresponding remotely located computing devices. The remotely located computing devices may include cloud computing devices, remotely located server devices, mobile computing devices (e.g. smart phones, tablets, and the like), other suitable remotely located computing devices, or a combination thereof. As described, the vehicle may include a plurality of ECUs connected by a communication network. Additionally, or alternatively, the vehicle may be in communication with one or more remotely located computing devices. The processors of the ECUs and/or the remotely located computing devices may be programed to control aspects of respective components of the vehicle and/or other suitable functions related to or not related to control of the vehicle. The ECUs and/or the remotely located computing devices may be programmed to provide corresponding specific functions for the respective components. As used herein, the term processor or processors may refer to an ECU, more than one ECU, a remotely located computing device, more than one remotely located computing device, or any suitable combination thereof.

Some, but not all, of the processors may run at a relatively higher throughput. The systems and methods described herein may be configured to take advantage of available (e.g., unused) processing throughput of designated processors through use of the communication network. The systems and methods described herein may be configured to build and deploy decentralized applications on the communication network by placing a portion of an application on another processor in the network and/or remotely located from the vehicle (e.g., and in communication with the network).

In some embodiments, the systems and methods described herein may be configured to execute a software throughput management application (management application) on a plurality of processors (e.g., including at least some of the processors of the ECUs and/or one or more remotely located processors). The management application may include a task observer and supervisor function, which is configured to record (e.g., store) idle task (e.g., idle time) and software stake information (e.g., software execution capability characteristic) for each of the processors of the plurality of processors. In some embodiments, the software stakes also include a proof of trust (e.g., indicating that the corresponding processor is trusted to executed software associated with the software stake) based on operator preselected processor proofs. In some embodiments, the processors may communicate proof of software stake to the communication network and the source processor (e.g., an ECU with software execution to offload to other ECUs and/or the remotely located computing devices to take advantage of idle time) may store recordings indicating available software stakes in the communication network.

In some embodiments, the systems and methods described herein may be configured to generate a request to a target processor in response to the source processor identifying space and execution bandwidth (e.g., idle processor time) for an available software stake in the target processor. The target processor may be configured to execute the management application. The management application on the target processor may receive the request and agree to execute the functional state from the source processor. The target processor may communicate to a "grant permission" (e.g., acceptance) signal indicating that the target processor agrees that the source processor may have access to the software stake for a limited stake run. The systems and methods described herein may be configured to communicate, from the source processor to the target processor, the software to be executed on the target processor in response to the source processor receiving the grant permission signal.

In some embodiments, the systems and methods described herein may be configure to process algorithms remotely within the information ecosystem of the vehicle. The systems and methods described herein may be configured to execute the algorithms on the EPS system, domain controller, the cloud (e.g., a remotely located computing device), other suitable computing device, or a combination thereof. The systems and methods described herein may be configured to dynamically distribute processing based on priorities, throughput, time constraints, resource capacity, security, and the like.

In some embodiments, the systems and methods described herein may be configured to use middle-ware to distribute processing in the information ecosystem. The systems and methods described herein may be configured to allow for relatively more complex algorithms and potentially reduce costs of EPS and other chassis systems by allowing such systems to use relatively smaller processors. The systems and methods described herein may be configured to allow for improved algorithm updating in the cloud and by using crowd data.

In some embodiments, the systems and methods described herein may be configured to treat the information ecosystem as one virtual ECU. The systems and methods described herein may be configured to use of middleware software to treat the information ecosystem as one virtual ECU. The systems and methods described herein may be configured to execute the middleware software to on the EPS system, domain controller, and cloud. The systems and methods described herein may be configured to provide middleware software that includes a throughput and resource observer function. The middleware observer on each processor may be configured to communicate with every other observer on every other respective processor in the system.

In some embodiments, the systems and methods described herein may be configured to identify functions by priorities, throughput, time constraints, and security definitions corresponding to design specifications. In some embodiments, the systems and methods described herein may be configured to define one or more interfaces to such functions (e.g., input and/or outputs), which may be facilitated through the throughput and resource observer function.

In some embodiments, the systems and methods described herein may be configured to identify complex and/or resource intensive functions. The systems and methods described herein may be configured to execute the identified complex and/or resource intensive functions the cloud or domain controller with the data transferred through the observer interface, using resources outside of the EPS system (e.g., which may allow the EPS to use a relatively smaller (e.g., less powerful) and relatively less expensive ECU, while allowing for improved processing capabilities). The systems and methods described herein may be configured to allow cloud functions to use crowd data and to updated using one function for many systems in the cloud.

In some embodiments, a source processor may receive, from a plurality of other processors, an idle time and at least one task execution characteristic corresponding to each respective processor of the plurality of other processors. In some embodiments, at least one processor of the plurality of other processors is remotely located from the source processor. The at least one task execution characteristic may indicate a capability of a respective processor of the plurality of other processors of executing a particular task. In some embodiments, the source processor may store the idle time and the at least one task execution characteristic for each of the plurality of other processors.

In some embodiments, the source processor to receive, from each of the plurality of other processors, a trust indication. The trust indication may indicate that a respective processor of the plurality of other processors is trusted to perform a corresponding task. The source processor may identify at least one target processor of the plurality of other processors to execute a task associated with the source processor based on the idle time, the trust indication, and/or the at least one task execution characteristic of the at least one target processor.

The source processor may communicate, to the at least one target processor, a task request requesting the at least one target processor execute the task associated with the source processor. The source processor, in response to receiving a communication from the at least one target processor indicating acceptance of the task, may communicate, to the at least one target processor, instructions for executing the task. In some embodiments, the at least one target processor executes the task according to the instructions for executing the task. The source processor may receive data, from the at least one target processor, corresponding to execution of the task.

Figure 1:
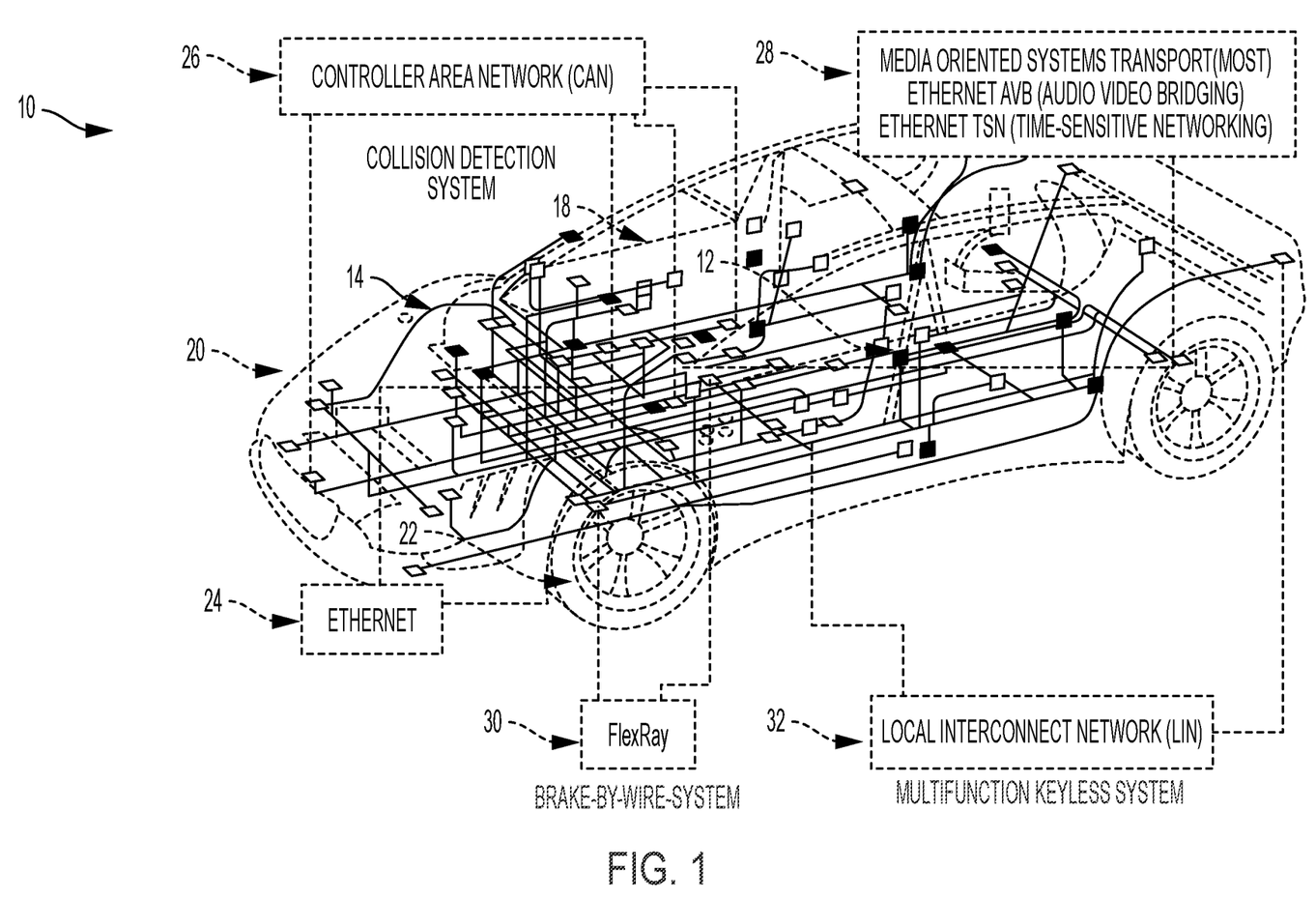
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network component (CAN) 26, a media oriented systems transport component (MOST) 28, a FlexRay component 30 (e.g., brake-by-wire system, and the like), and a local interconnect network component (LIN) 32. The vehicle 10 may use the CAN 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle.

The vehicle 10 may include an electronic power steering (EPS) system or other suitable steering system. The EPS may be configured to control various steering aspects of the vehicle 10. For example, the EPS may receive an input torque demand from the operator of the vehicle 10 via the handwheel of the vehicle 10. The EPS system may determine an assist torque based on the input torque. The EPS may selectively control one or more motors to provide the assist torque to the various steering components of the vehicle 10. The assist torque may correspond to an amount of torque that reduces an effort required by the operator of the vehicle 10 to steer the vehicle 10. It should be understood that the EPS system may include various components and that the EPS system may be configured to provide any suitable function in addition to or instead of those described herein. The vehicle 10 may include additional or fewer features than those generally illustrated and/or disclosed herein.

Figure 2:
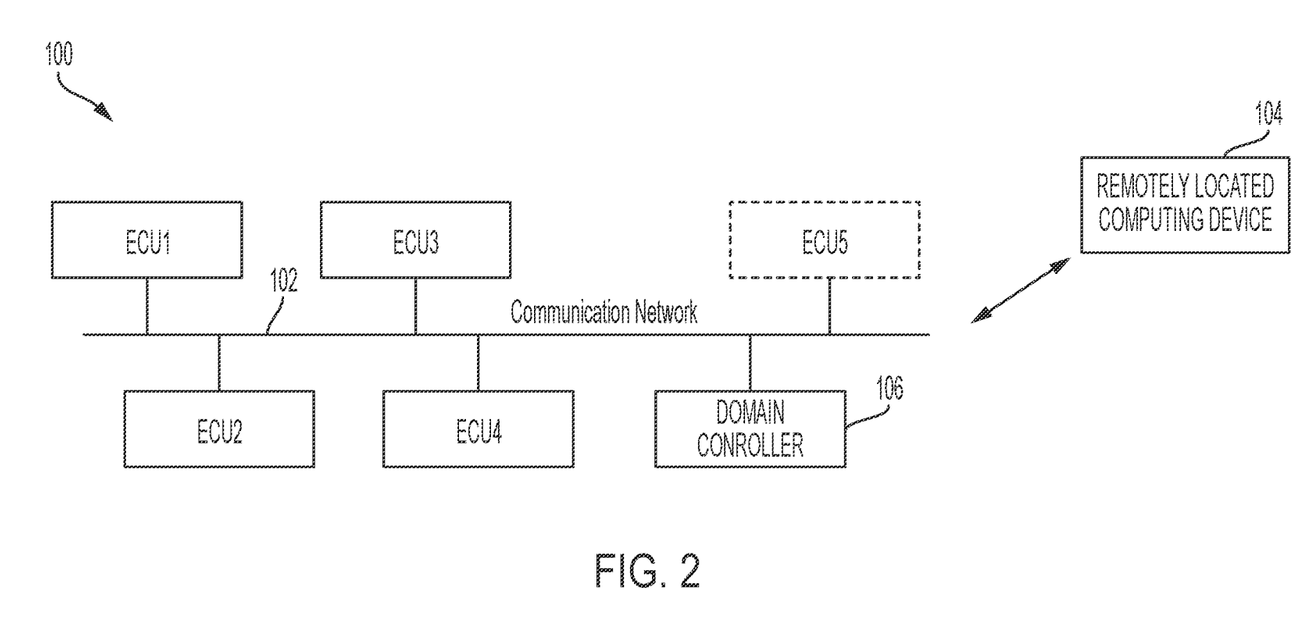
FIG. 2 generally illustrates a distributed processing system according to the principles of the present disclosure.

The vehicle 10 may include a distributed processing system 100 as is generally illustrated in FIG. 2. As is generally illustrated in FIG. 2, the system 100 may include a network of electronic control units (ECU), such as ECU 1, ECU 2, ECU 3, ECU 4, and ECU 5. While only five ECUs are illustrated, the system 100 may include any suitable number of ECUs (e.g., 10s or 100s of ECUs) and/or other components than is generally illustrated and/or described herein.

The system 100 may also include one or more remotely located computing devices 104. The remotely located computing device 104 may include a cloud computing device, a server computing device, a mobile computing device, any other suitable remotely located computing device, or a combination thereof. The remotely located computing device 104 may include any suitable number of remotely located computing devices, which may be collocated or remotely located from one another and the vehicle 10. The system 100 may include one or more domain controller 106. The domain controller 106 may include any suitable domain controller, such as a domain controller configured to control various functions of the EPS system or other suitable domain controller.

In some embodiments, the remotely located computing device 104 may include a cloud computing architecture that uses on crowd data received for multiple vehicles, including the vehicle 10. The remotely located computing device 104 may provide post processing or analytics to be used by one or more of the vehicles, including the vehicle 10, in a specific application at a specific time.

Each of the ECUs, the domain controller 106, and the remotely located computing device 104 may include one or more respective processors and memory that includes instructions that, when executed by a respective processor, cause the processor to, at least, perform various functions, including those described herein. In some embodiments, the each ECU, the domain controller 106, and the remotely located computing device 104 includes a processor, and each processor communicates with associated memory. The ECUs, the domain controller 106, and the remotely located computing device 104 may include any suitable processor, such as those described herein. The respective memory may comprise a single disk or a plurality of disks (e.g., hard drives), and includes a storage management module that manages one or more partitions within the memory. In some embodiments, the memory may include flash memory, semiconductor (solid state) memory or the like. The memory may include Random Access Memory (RAM), a Read-Only Memory (ROM), or a combination thereof.

The system 100 may include a communication network 102. The network 102 may include any suitable network, such as the Ethernet component 24, the CAN component 26, the MOST component 28, the FlexRay component 30, the LIN component 32, any other suitable network or other communication component, or a combination thereof. Each respective ECU, the domain controller 106 of the system 100 may communicate with each other ECU and/or a subset of the other ECUs, and/or the domain controller 106 via the network 102. For example, the ECU 1 may be configured to perform braking operations for the vehicle 10. The ECU 1 may receive sensor data from various sensors of the vehicle 10 and may determine whether to actuate a brake of the vehicle 10. The ECU 2 may control, for example, braking mechanism of the vehicle 10. The ECU 1 may communicate with the ECU 2 to actuate the braking mechanism based on the sensor data received by the ECU 1. Additionally, or alternatively, the remotely located computing device 104 may communicate with the network 102 using any suitable wireless or wired communications systems, networks, protocols, and the like.

In some embodiments, the system 100 may be configured to create a virtual ECU using the ECU 1, the ECU 2, the ECU 3, the ECU 4, then ECU 5, the domain controller 106, the remotely located computing device 104, any other ECU of the vehicle 10, any other domain controllers of the vehicle 10, and/or any other remotely located computing device. For example, as is generally illustrate din FIG. 3B, the system 100 may create a single virtual ECU using an EPS system 108 (e.g., which may include one or more of the ECU 1, the ECU 2, the ECU 3, the ECU 4, the ECU 5, or any other suitable ECU of the vehicle 10), the domain controller 106, and the remotely located computing device 104. The system 100 may use any combination of one or more of the ECUs, the domain controller 106, and the remotely located computing device 104 as a virtual ECU that processes data in any one of the one or more of the ECUs, the domain controller 106, and the remotely located computing device 104 to be used any other ECUs, the domain controller 106, and the remotely located computing device 104 in real-time or substantially real-time. The system 100 may provide observer and scheduler functionality on each of the EPS system 108, the domain controller 106, and/or the remotely located computing device.

Figure 4A:
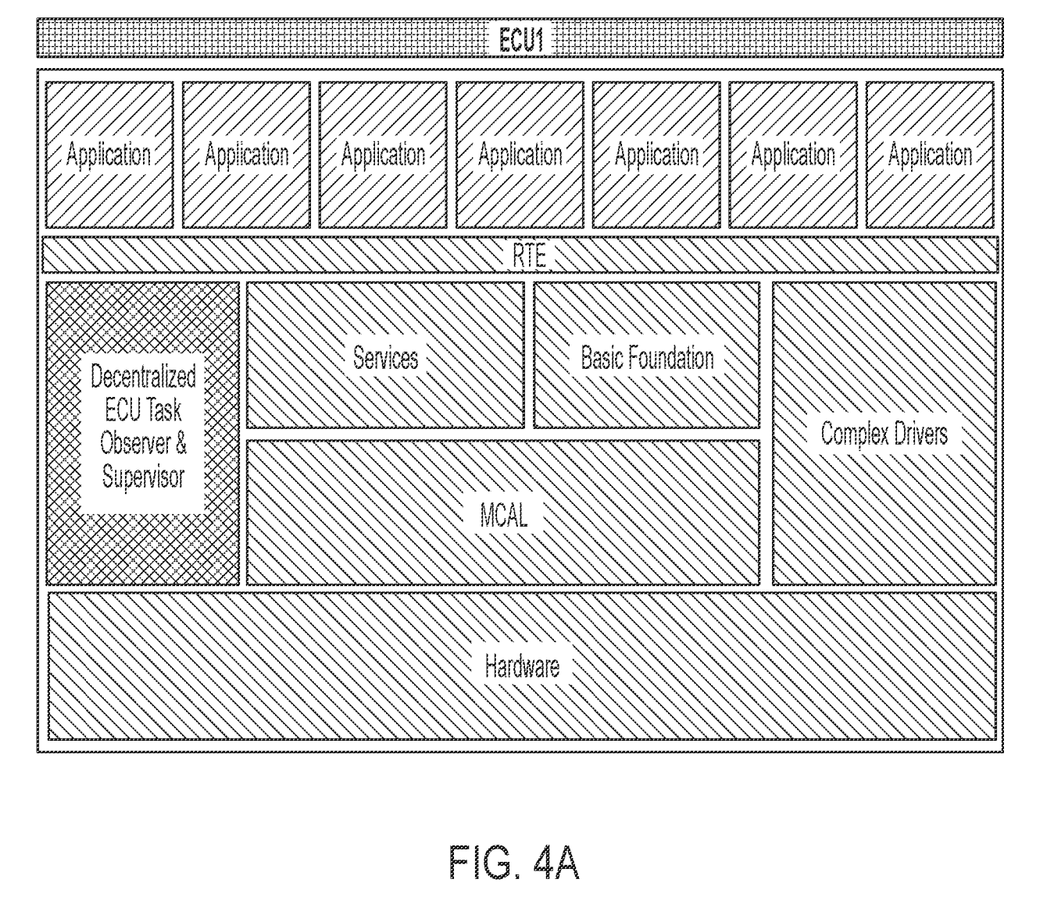
FIGS. 4A and 4B generally illustrate electronic control unit software architectures according to the principles of the present disclosure.
Figure 4B:
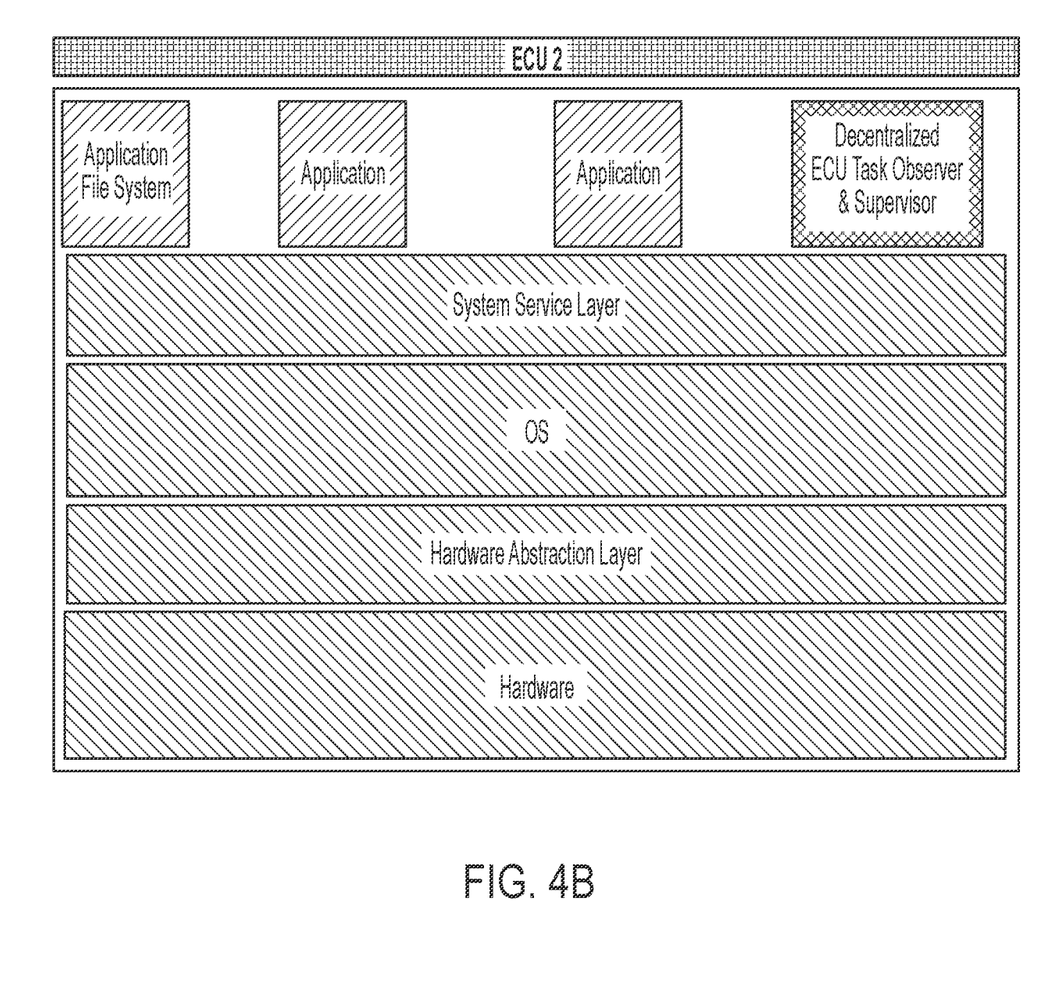

As is generally illustrated in FIGS. 4A and 4B, the ECU 1, or any other ECU of the system 100, may include an automotive system architecture (AutoSAR) that includes hardware, complex drivers, a microcontroller abstraction layer (MCAL), a basic foundation, various services, a decentralized ECU task observer and supervisor, a run-time environment (RTE), and application layer comprising various applications. In some embodiments, the ECU 2, or any other suitable ECU of the system 100, may include a non-AutoSAR architecture that includes hardware, a hardware abstraction layer, an operating system (OS), a system services layer, and an application layer comprising various applications including the decentralized ECU task observer and supervisor. In some embodiment, the ECU 3, or any other suitable ECU of the system 100, may include a non-AutoSAR without OS architecture that includes hardware, a hardware abstraction layer, and the decentralized ECU task observer and supervisor;

In some embodiments, the system 100 may improve throughput by offloading various software or tasks from a source ECU to at least one of another ECU, the domain controller 106, or the remotely located computing device 104 that has idle time and that is capable of executing the software or tasks. For example, the ECU 1 may represent a source ECU and may include software or tasks capable of being offloaded (e.g., referred to as a software stake) to other ECUs, the domain controller 106, and/or the remotely located computing device 104 in order to take advantage of idle time of the processors associated with the other ECUs, the domain controller 106, and/or the remotely located computing device 104. The software stake may include software or tasks having limited input and output ranges, non-safety critical software or tasks, relatively small software or tasks, software or tasks using relatively simple math or minimum logical functions, software or tasks using basic functions, software or tasks having a finite loop, software or tasks using temporary (volatile) variables, other suitable software or tasks, or a combination thereof.

The system 100 may be configured to initiate the decentralized ECU task observer and supervisor application on at least some of the ECUs, the domain controller 106, and/or the remotely located computing device 104. The decentralized ECU task observer and supervisor application may include a software throughput management application and may be referred to herein as the middleware application.

Figure 3A:
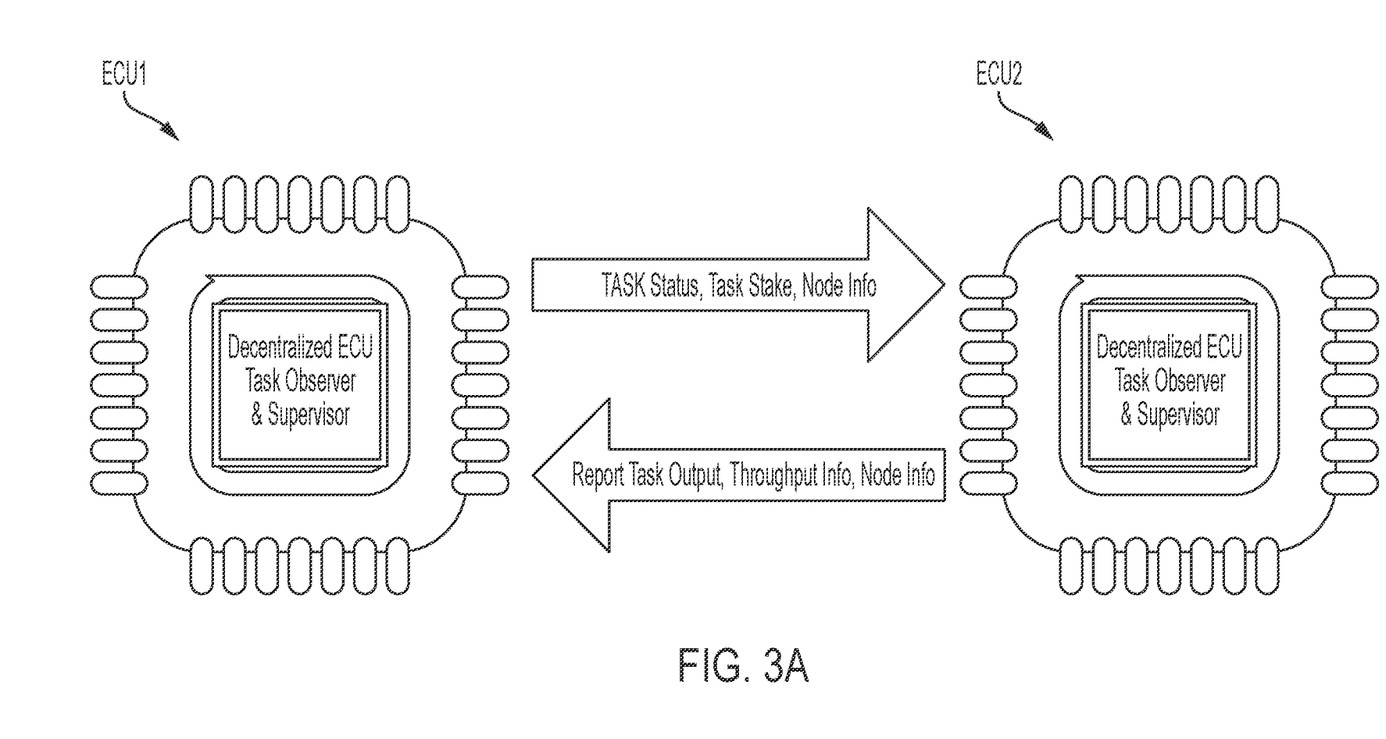
FIGS. 3A and 3B generally illustrate communication between processors according to the principles of the present disclosure.
Figure 3B:
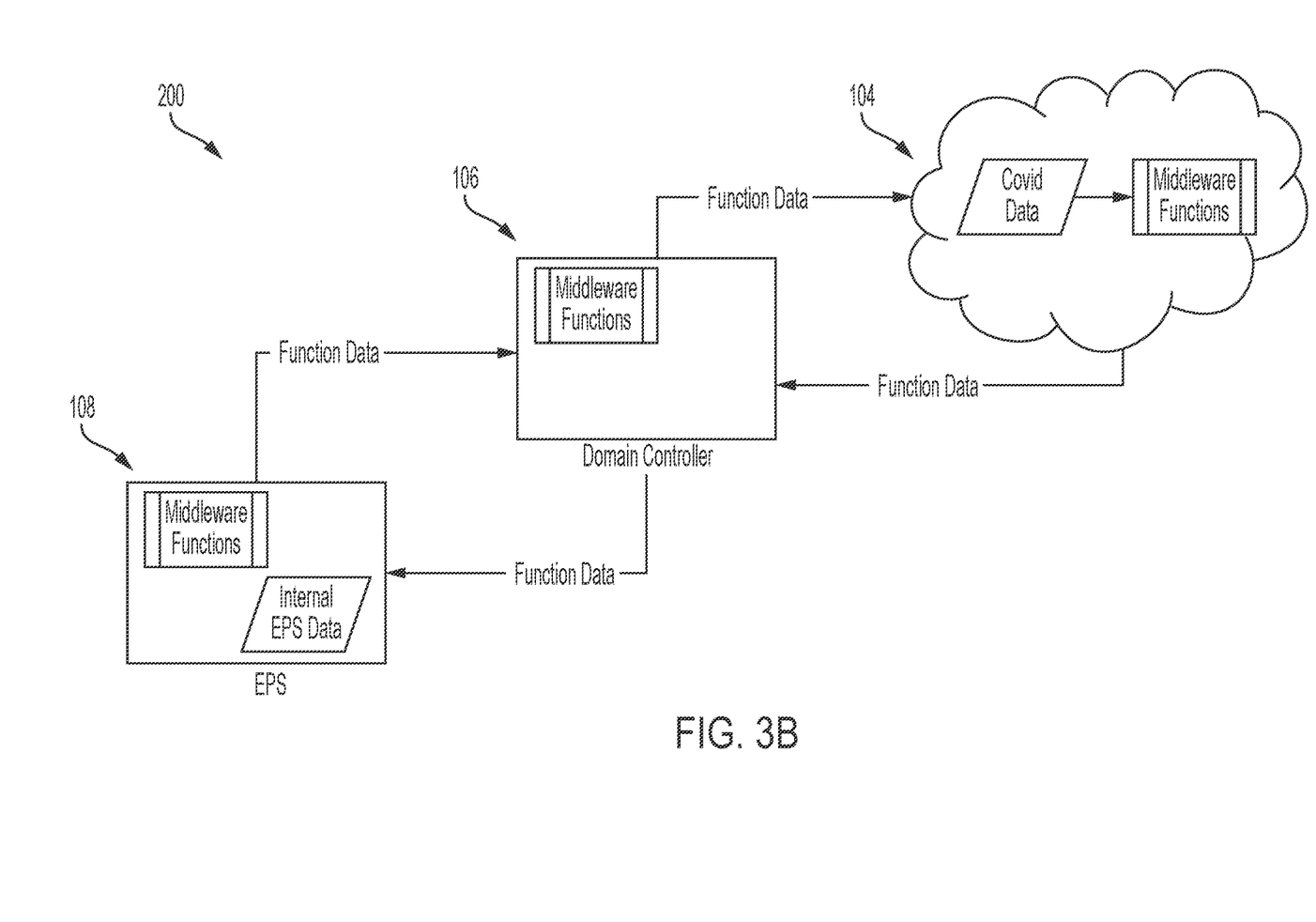

As is generally illustrated in FIG. 3A, an instance of the middleware application may reside on the ECU 1 and the ECU 2, and while not illustrated, an instance of the middleware application may also reside some or all of the other ECUs and the domain controller 106 on the network 102. Additionally, or alternatively, as is generally illustrated in FIG. 3B, an instance of the middleware application may reside on the ECUs of the EPS system 108 (e.g., or any other ECU of the vehicle 10), the domain controller 106, and/or the remotely located computing device 104. The ECU 1, while executing the middleware application, may receive information from the other ECUs, the domain controller 106, and/or the remotely located computing device 104 executing the middleware application. The information may include, for each respective processor of each of the ECUs, the domain controller 106, and the remotely located computing device 104 executing the middleware application, idle time, software stake information, proof of trust information, other suitable information, or a combination thereof.

The idle time may indicate an amount of available processing cycles for a respective processor. The software stake information may indicate a software execution or task execution capability characteristic of a respective processor. For example, the software stake information for a respective processor may indicate whether the respective processor is capable of executing the software stake that the processor of the ECU 1 is offloading. The proof of trust information may indicate whether the respective processor is trusted (e.g. as designated programmatically or selectively by the operator, programmer, or user of the system 100) to execute the software stake of the processor of the ECU 1. The processor of the ECU 1 may store, in memory, the information received from the other processors. For example, the processor of the ECU 1 may update a table stored in memory, a database, or other suitable storage location. The table, database, or other suitable storage location may indicate the idle time, software stake information, proof of trust information, and/or other suitable information for each of the processors.

The processor of the ECU 1 may be configured to identify a target processor (e.g., of the other ECUs, the domain controller 106, and the remotely located computing device 104) to execute the software stake of the processor of the ECU 1. For example, the processor of the ECU 1 may identify a target processor, for example the processor of the remotely located computing device 104, capable of executing the software stake from the table stored in memory. It should be understood that the respective processor of any of the ECUs, the domain controller 106, and the remotely located computing device 104 may be capable of being identified and operating as the target processor. Additionally, or alternatively, more than one respective processor of any of the ECUs, the domain controller 106, and the remotely located computing device 104 may cooperatively operate as the target processor to perform the software stake of the ECU 1 or any other suitable software or task for any other suitable processor. The processor of the ECU 1 may determine whether the target processor has sufficient idle time to execute the software stake based on the corresponding idle time of the target processor (e.g., the processor of the remotely located computing device 104 or any other suitable processor) stored on the table. Additionally, or alternatively, the processor of the ECU 1 may determine whether the target processor is trusted to execute the software stake based on the proof of trust information stored in the table.

If the processor of the ECU 1 determines that the target processor is either incapable of executing the software stake or has insufficient idle time to execute the software stake, the ECU 1 may identify another processor (e.g., of any of the ECUs, the domain controller 106, and the remotely located computing device 104) as the target processor. Additionally, or alternatively, if the processor of the ECU 1 determines that the identified target processor is not trusted to execute the software stake, the processor of the ECU 1 may identify another processor (e.g., of any of the ECUs, the domain controller 106, and the remotely located computing device 104) as the target processor. Conversely, if the processor of the ECU 1 determines that the identified processor is capable of executing the software stake, has sufficient idle time to execute the software stake, and is trusted to execute the software stake, the processor of the ECU 1 generates a request (e.g., a signal indicating the request) to execute the software stake. The processor of the ECU 1 may communicate the request to the identified target processor.

The identified target processor, in response to receiving the request to execute the software stake, determines whether to accept the request. For example, the processor of the remotely located computing device 104 may determine whether the processor of the remotely located computing device 104 continues to have sufficient idle time to execute the software stake. If the target processor determines to accept the request to execute the software stake, the target processor generates an acceptance signal (e.g., a signal indicating the acceptance) and communicates the acceptance signal to the processor of the ECU 1.

The processor of the ECU 1, in response to receiving the acceptance from the target processor, may communicate the software associated with the software stake to the target processor. The target processor, in response to receiving the software with the software stake from the processor of the ECU 1 flashes or installs the software to the target processor. The target processor may then execute the software associated with the software stake. The target processor may communicate data associated with the execution of the software to the processor of the ECU 1. The data may include output of the execution of the software or other suitable data.

In some embodiments, the system 100 may perform the methods described herein. However, the methods described herein as performed by system 100 are not meant to be limiting, and any type of software executed on a controller can perform the methods described herein without departing from the scope of this disclosure. For example, a controller, such as a processor executing software within a computing device, can perform the methods described herein.

Figure 5:
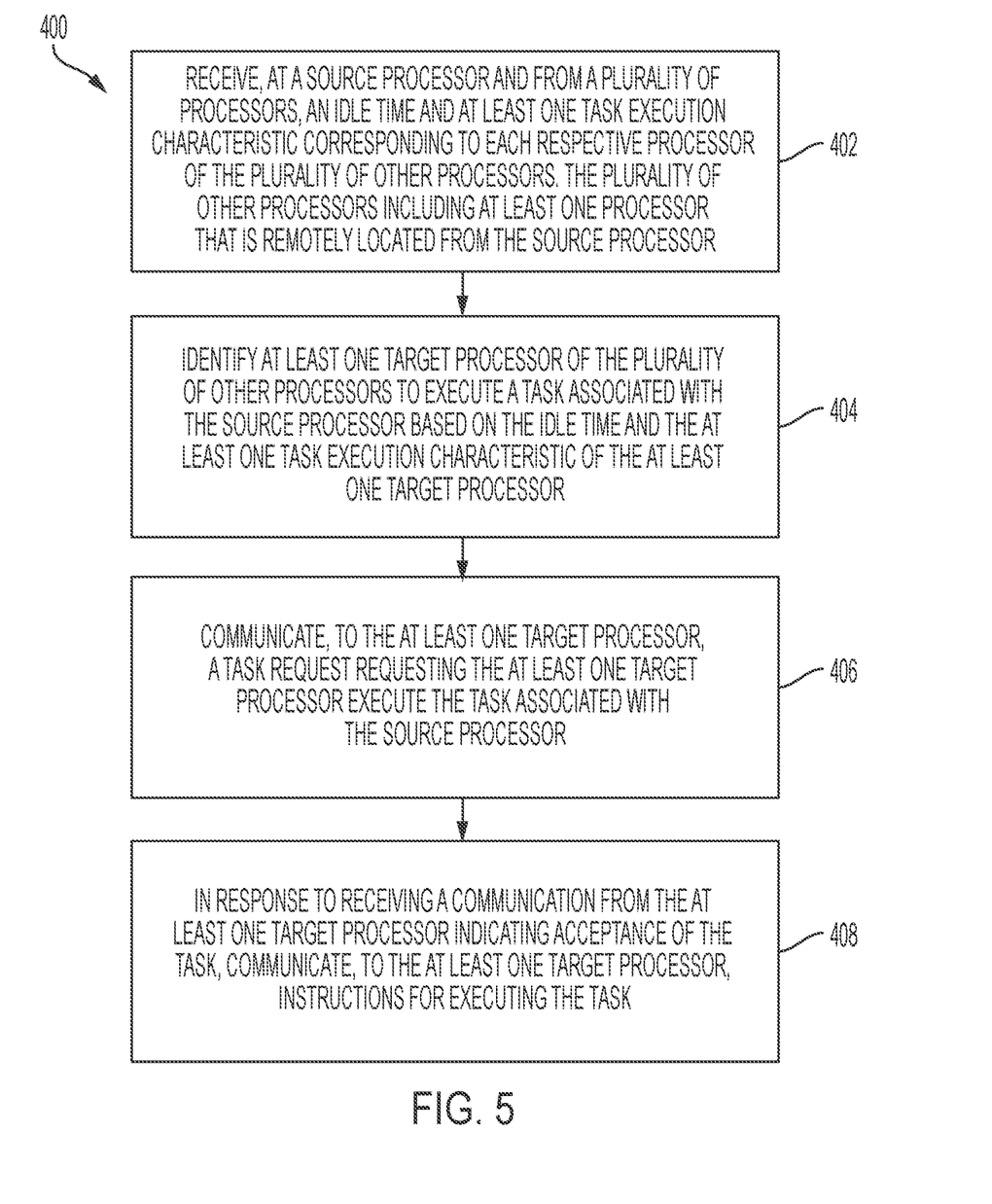
FIG. 5 is a flow diagram generally illustrating a distributed processing method according to the principles of the present disclosure.

FIG. 5 is a flow diagram generally illustrating a distributed processing method 400 according to the principles of the present disclosure. At 402, the method 400 receives, at a source processor from a plurality of other processors, an idle time and at least one task execution characteristic corresponding to each respective processor of the plurality of other processors, where the plurality of other processors includes at least one processor remotely located from the source processor. For example, the processor of the ECU 1 (e.g., or other suitable processor of the ECU, the domain controller 106, and/or the remotely located computing device 104) receives idle time information, software stake information (e.g., including software and/or task execution capability characteristics), and/or proof of trust information from the processors corresponding to the other ECUs, the domain controller 106, and/or the remotely located computing device 104. The processor of the ECU 1 may store the received idle time information, software stake information, and/or proof of trust information in the table in memory.

At 404, the method 400 identifies a target processor of the plurality of other processors to execute a task associated with the source processor based on the idle time and the at least one task execution characteristic of the at least one target processor. For example, the processor of the ECU 1 may identify a processor, such as the processor corresponding to any of the ECUs, the domain controller 106, and the remotely located computing device 104 as the target processor, based on the information stored in the table. It should be understood that the target processor may include more than one of the processors of the ECUs, the domain controller 106, and/or the remotely located computing device 104. The more than one processors may cooperatively operate to function as the target processor (e.g., by respectively executing various tasks offloaded by the processor of the ECU 1).

At 406, the method 400 communicates, to the at least one target processor, a task request requesting the at least one target processor execute the task associated with the source processor. For example, the processor of the ECU 1 generates and communicates a request to execute the software and/or task associate with the software stake to the target processor.

At 408, the method 400 in response to receiving a communication from the at least one target processor indicating acceptance of the task, communicates, to the at least one target processor, instructions for executing the task. For example, the processor of the ECU 1 may receive the acceptance signal from the target processor. The processor of the ECU 1 may generate instructions for executing the task. The processor of the ECU 1 may communicate the instructions for executing the task to the target processor. The target processor may execute the task according to the instructions. The target processor may communicate data, corresponding to execution of the task, to the processor of the ECU 1.

In some embodiments, a system for distributed processing includes a source processor and a memory. The memory includes instructions that, when executed by the source processor, cause the source processor to: receive, from a plurality of other processors, an idle time and at least one task execution characteristic corresponding to each respective processor of the plurality of other processors, wherein at least one processor of the plurality of other processors is remotely located from the source processor; identify at least one target processor of the plurality of other processors to execute a task associated with the source processor based on the idle time and the at least one task execution characteristic of the at least one target processor; communicate, to the at least one target processor, a task request requesting the at least one target processor execute the task associated with the source processor; and, in response to receiving a communication from the at least one target processor indicating acceptance of the task, communicate, to the at least one target processor, instructions for executing the task.

In some embodiments, the at least one task execution characteristic indicates a capability of a respective processor of the plurality of other processors of executing a particular task. In some embodiments, the instructions further cause the source processor to store the idle time and the at least one task execution characteristic for each of the plurality of other processors. In some embodiments, the at least one target processor executes the task according to the instructions for executing the task. In some embodiments, the instructions further cause the source processor to receive data, from the at least one target processor, corresponding to execution of the task. In some embodiments, the instructions further cause the source processor to receive, from each of the plurality of other processors, a trust indication. In some embodiments, the trust indication indicates that a respective processor of the plurality of other processors is trusted to perform a corresponding task. In some embodiments, the source processor and at least one other processor of the plurality of other processors are disposed in a vehicle.

In some embodiments, a method for distributed processing includes receiving, at a source processor and from a plurality of other processors, an idle time and at least one task execution characteristic corresponding to each respective processor of the plurality of other processors, wherein at least one processor of the plurality of other processors is remotely located from the source processor. The method also includes identifying at least one target processor of the plurality of other processors to execute a task associated with the source processor based on the idle time and the at least one task execution characteristic of the at least one target processor. The method also includes communicating, to the at least one target processor, a task request requesting the at least one target processor execute the task associated with the source processor and, in response to receiving a communication from the at least one target processor indicating acceptance of the task, communicating, to the at least one target processor, instructions for executing the task.

In some embodiments, the at least one task execution characteristic indicates a capability of a respective processor of the plurality of other processors of executing a particular task. In some embodiments, the method also includes storing, at the source processor, the idle time and the at least one task execution characteristic for each of the plurality of other processors. In some embodiments, the at least one target processor executes the task according to the instructions for executing the task. In some embodiments, the method also includes receiving, at the source processor, data, from the at least one target processor, corresponding to execution of the task. In some embodiments, the method also includes receiving, at the source processor and from each of the plurality of other processors, a trust indication. In some embodiments, the trust indication indicates that a respective processor of the plurality of other processors is trusted to perform a corresponding task. In some embodiments, the source processor and at least one other processor of the plurality of other processors are disposed in a vehicle.

In some embodiments, a distributed processing apparatus includes a processor of a vehicle and a memory. The memory includes instructions that when executed by the processor, cause the processor to: receive, from at least one other processor of the vehicle and at least one other processor remotely located from the vehicle, an idle time and at least one task execution characteristic corresponding to each respective processor of the at least one other processor of the vehicle and the at least one other processor remotely located from the vehicle; identify at least one target processor of the at least one other processor of the vehicle and the at least one other processor remotely located from the vehicle to execute a task associated with the processor of the vehicle based on the idle time and the at least one task execution characteristic of the at least one target processor; communicate, to the at least one target processor, a task request requesting the at least one target processor execute the task associated with the processor of the vehicle; and, in response to receiving a communication from the at least one target processor indicating acceptance of the task, communicate, to the at least one target processor, instructions for executing the task.

In some embodiments, the at least one task execution characteristic indicates a capability of a respective processor of the at least one other processor of the vehicle and the at least one other processor remotely located from the vehicle of executing a particular task. In some embodiments, the instructions further cause the processor of the vehicle to store the idle time and the at least one task execution characteristic for each of the at least one other processor of the vehicle and the at least one other processor remotely located from the vehicle. In some embodiments, the at least one target processor executes the task according to the instructions for executing the task.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

Having thus described the invention, it is claimed:

1. A system for distributed processing, the system comprising:
   a source processor that includes an automotive system architecture including at least a microcontroller abstraction layer, wherein the source processor is associated with a steering system, and wherein the steering system includes one of an electronic power steering system and a steer-by-wire steering system; and
   a memory that includes instructions that, when executed by the source processor, cause the source processor to:
      receive, from a plurality of other processors, an idle time and at least one task execution characteristic corresponding to each respective processor of the plurality of other processors, wherein the source processor is disposed on a controller area network within a vehicle and configured to control at least a portion of at least one vehicle operation, wherein at least one processor of the plurality of other processors is remotely located from the controller area network, wherein at least one of the plurality of other processors is associated with a vehicle system other than the steering system, wherein the source processor executes an instance of a software throughput management application that includes a task observer and a supervisor function, wherein each processor of the plurality of other processors executes another instance of the software throughput management application configured to communicate with the instance of the software throughput management application executed by the source processor, and wherein the instance of the software throughput management application executed by the source processor is configured to communicate with the instances of the software throughput management application executed on each processor of the plurality of other processors to send or receive the idle time for each respective processor of the plurality of other processors and the at least one task execution characteristic of each respective processor of the plurality of other processors;
      store the idle time and the at least one task execution characteristic in the memory;
      identify at least one target processor of the plurality of other processors to execute a task associated with the source processor based on the idle time and the at least one task execution characteristic of the at least one target processor, wherein the idle time indicates an amount of available processing cycles for the at least one target processor sufficient to execute the task associated with the source processor, and wherein the at least one task execution characteristic of the at least one target processor includes proof of trust information indicating that the at least one target processor is trusted by the source processor to execute the task associated with the source processor;
      communicate, to the at least one target processor, a task request requesting the at least one target processor execute the task associated with the source processor; and
      in response to receiving a communication from the at least one target processor indicating acceptance of the task, communicate, to the at least one target processor, instructions for executing the task, wherein the at least one target processor executes the task according to the instructions for executing the task instead of the source processor executing the task.

2. The system of claim 1, wherein the at least one task execution characteristic indicates a capability of a respective processor of the plurality of other processors of executing a particular task.

3. The system of claim 1, wherein the instructions further cause the source processor to receive data, from the at least one target processor, corresponding to execution of the task.

4. The system of claim 1, wherein the at least one task execution characteristic corresponding to each respective processor of the plurality of other processors includes proof of trust information corresponding to each respective processor of the plurality of other processors.

5. The system of claim 4, wherein the proof of trust information indicates that a respective processor of the plurality of other processors is trusted to perform a corresponding task.

6. The system of claim 1, wherein at least one other processor of the plurality of other processors is disposed in the vehicle.

7. A method for distributed processing, the method comprising:
   receiving, from a plurality of other processors and at a source processor that includes an automotive system architecture including at least a microcontroller abstraction layer, an idle time and at least one task execution characteristic corresponding to each respective processor of the plurality of other processors, wherein the source processor is disposed on a controller area network within a vehicle and configured to control at least a portion of at least one vehicle operation, wherein at least one processor of the plurality of other processors is remotely located from the controller area network, wherein the source processor is associated with a steering system, wherein at least one of the plurality of other processors is associated with a vehicle system other than the steering system, wherein the steering system includes one of an electronic power steering system and a steer-by-wire steering system, wherein the source processor executes an instance of a software throughput management application that includes a task observer and a supervisor function, wherein each processor of the plurality of other processors executes another instance of the software throughput management application configured to communicate with the instance of the software throughput management application executed by the source processor, and wherein the instance of the software throughput management application executed by the source processor is configured to communicate with the instances of the software throughput management application executed on each processor of the plurality of other processors to send or receive the idle time for each respective processor of the plurality of other processors and the at least one task execution characteristic of each respective processor of the plurality of other processors;

storing the idle time and the at least one task execution characteristic in a memory;

identifying at least one target processor of the plurality of other processors to execute a task associated with the source processor based on the idle time and the at least one task execution characteristic of the at least one target processor, wherein the idle time indicates an amount of available processing cycles for the at least one target processor sufficient to execute the task associated with the source processor, and wherein the at least one task execution characteristic of the at least one target processor includes proof of trust information indicating that the at least one target processor is trusted by the source processor to execute the task associated with the source processor;

communicating, to the at least one target processor, a task request requesting the at least one target processor execute the task associated with the source processor; and in response to receiving a communication from the at least one target processor indicating acceptance of the task, communicating, to the at least one target processor, instructions for executing the task, wherein the at least one target processor executes the task according to the instructions for executing the task instead of the source processor.

8. The method of claim 7, wherein the at least one task execution characteristic indicates a capability of a respective processor of the plurality of other processors of executing a particular task.

9. The method of claim 7, further comprising receiving, at the source processor, data, from the at least one target processor, corresponding to execution of the task.

10. The method of claim 7, wherein the at least one task execution characteristic corresponding to each respective processor of the plurality of other processors includes proof of trust information corresponding to each respective processor of the plurality of other processors.

11. The method of claim 10, wherein the proof of trust information indicates that a respective processor of the plurality of other processors is trusted to perform a corresponding task.

12. The method of claim 7, wherein at least one other processor of the plurality of other processors is disposed in the vehicle.

13. A distributed processing apparatus, comprising:
a processor disposed on a controller area network of a vehicle, the processor including an automotive system architecture that includes at least a microcontroller abstraction layer; and
a memory including instructions that when executed by the processor, cause the processor to:
receive, from at least one other processor disposed on the controller area network of the vehicle and at least one other processor remotely located from the controller area network of the vehicle, an idle time and at least one task execution characteristic corresponding to each respective processor of the at least one other processor of the vehicle and the at least one other processor remotely located from the controller area network of the vehicle, wherein the processor is associated with a steering system, wherein at least one other processor is associated with a vehicle system other than the steering system, wherein the steering system includes one of an electronic power steering system and a steer-by-wire steering system, wherein the processor executes an instance of a software throughput management application that includes a task observer and a supervisor function, wherein the at least one other processor executes another instance of the software throughput management application configured to communicate with the instance of the software throughput management application executed by the processor, and wherein the instance of the software throughput management application executed by the processor is configured to communicate with the instance of the software throughput management application executed on the at least one other processor to send or receive the idle time for the at least one other processor and the at least one task execution characteristic of the at least one other processor;

store the idle time and the at least one task execution characteristic in the memory;

identify at least one target processor of the at least one other processor disposed on the controller area network of the vehicle and the at least one other processor remotely located from the controller area network of the vehicle to execute a task associated with the processor disposed on the controller area network of the vehicle based on the idle time and the at least one task execution characteristic of the at least one target processor, wherein the idle time indicates an amount of available processing cycles for the at least one target processor sufficient to execute the task associated with the processor disposed on the controller area network of the vehicle, and wherein the at least one task execution characteristic of the at least one target processor includes proof of trust information indicating that the at least one target processor is trusted by the processor disposed on the controller area network of the vehicle to execute the task associated with the processor disposed on the controller area network of the vehicle;

communicate, to the at least one target processor, a task request requesting the at least one target processor execute the task associated with the processor disposed on the controller area network of the vehicle; and in response to receiving a communication from the at least one target processor indicating acceptance of the task, communicate, to the at least one target processor, instructions for executing the task, wherein the at least one target processor executes the task according to the instructions for executing the task instead of the processor disposed on the controller area network of the vehicle.

14. The distributed processing apparatus of claim 13, wherein the at least one task execution characteristic indicates a capability of a respective processor of the at least one other processor disposed on the controller area network of the vehicle and the at least one other processor remotely located from the controller area network of the vehicle of executing a particular task.

* * * * *